Jan. 3, 1933.  F. V. BARYCZ  1,892,925
COLLAPSIBLE FUSELAGE FOR AIRPLANES AND THE LIKE
Filed Sept. 8, 1931
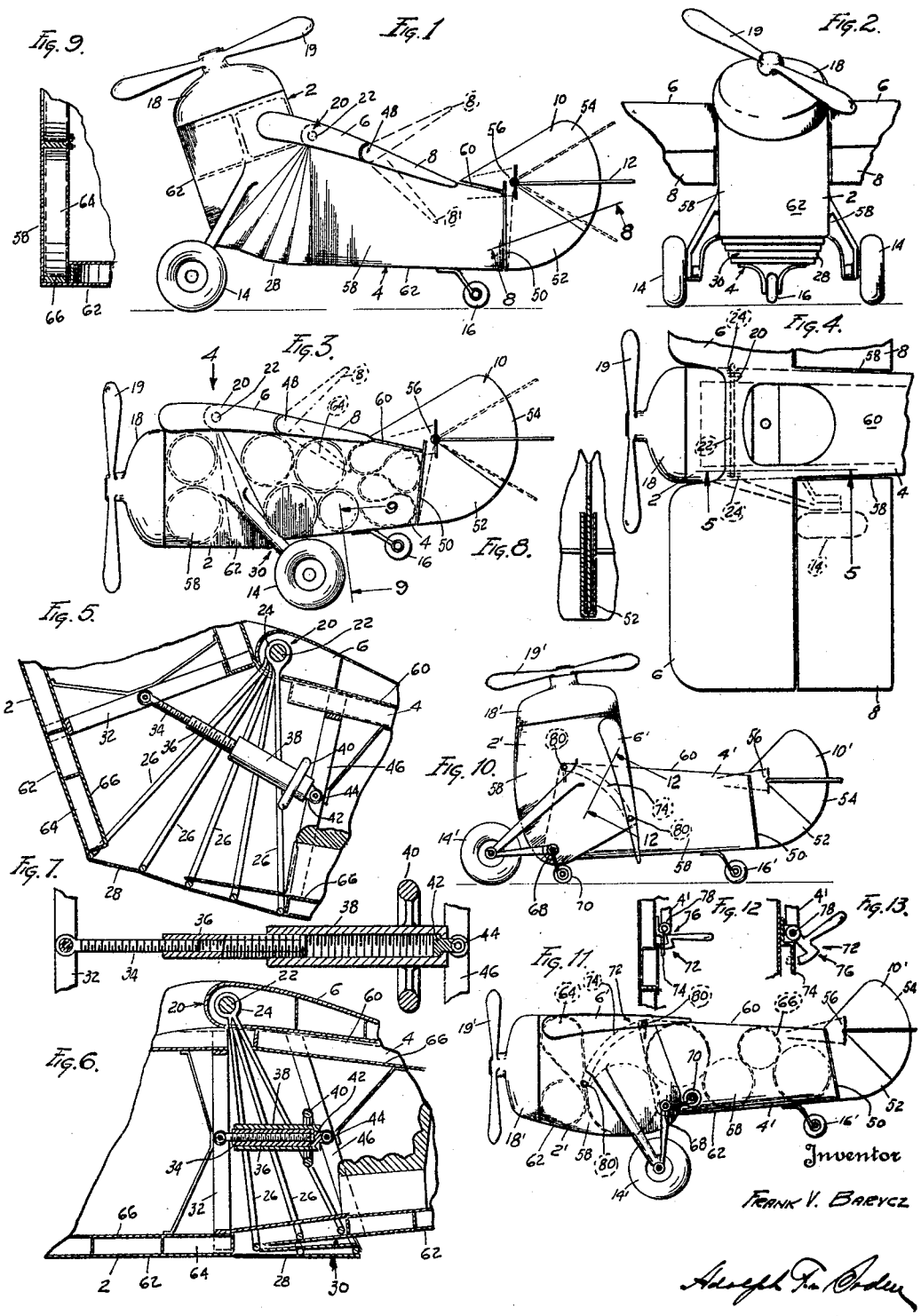
Inventor
FRANK V. BARYCZ
Attorney Patented Jan. 3, 1933

1,892,925

UNITED STATES PATENT OFFICE

FRANK V. BARYCZ, OF LOS ANGELES, CALIFORNIA

COLLAPSIBLE FUSELAGE FOR AIRPLANES AND THE LIKE

Application filed September 8, 1931. Serial No. 561,543.

My invention relates to airplane fuselage construction and more particularly to such type of fuselage structure, whereby the airplane propelled by any conventional engine, may be lifted from the ground surface almost vertically, and when in air, said fuselage may be adjusted to a position most adaptable for flying conditions, further, when landing upon a limited space of ground, or due to the improper or careless maneuvering of said airplane by the pilot while landing, or in case of an accident, said plane striking the ground or any obstruction thereon, or due to forced landing on very rough ground and in the unknown territory to the pilot, said airplane, due to my novel form of fuselage construction will not become damaged and entirely useless and therefore preventing serious accidents and provide safe transportation to the passengers at all times.

It accordingly is an object of my invention to provide said fuselage of said airplane with buoyant means, such as gas enclosures or spaces within the wall of said fuselage, wherein the gas bags filled with gas, such as hydrogen or helium may be positioned, thus rendering said plane buoyant and easy to handle while on the ground or in the air.

A further object of my invention is to provide said airplane fuselage of such construction, whereby the engine of said plane may be placed in position adapted to pull the plane off the ground, without resorting to the usual long run-ways, and also having the adjusting means adjusted in such a position, whereby the position of the engine relative to the fuselage may be easily adjusted, thus providing the stream line effect of the fuselage while in flight.

Another object of my invention is to provide variable locking means for said fuselage hinge, which may be inexpensive, light in construction and entirely reliable, and which may be very readily reached by the pilot and thus, while landing, by adjusting the position of the engine in upward direction, the plane will settle very readily in places and spaces otherwise unaccessible or dangerous for landing.

A further object of my invention is to provide said fuselage structure with the elevating and the steering mechanism, which will be most effective for taking off the ground and landing as hereinbefore mentioned.

The further objects and advantages as will hereinafter more fully appear, I attain by the construction described in this specification and illustrated on the drawing forming a part of my application.

Reference is had to the accompanying drawing in which the reference characters denote the similar parts.

In the drawing;

Fig. 1 is the side view of my novel form fuselage construction, adapted by the airplanes and adjusted for the upward flight.

Fig. 2 is the front elevational view thereof.

Fig. 3 shows the fuselage in position, while in flight.

Fig. 4 shows the top view of the plane, taken in the direction of the arrow 4, of the Fig. 3.

Fig. 5 shows the enlarged cross-sectional view of my invention taken on the line 5—5, of the Fig. 4.

Fig. 6 shows the enlarged cross-sectional view, taken on the line 5—5 of the Fig. 4 adjusted for flying.

Fig. 7 is the enlarged cross-sectional view of the adjusting apparatus.

Fig. 8 is the cross-sectional view of the steering mechanism taken on the line 8—8 of the Fig. 1.

Fig. 9 is the cross-sectional view of the fuselage structure taken on the line 9—9, of the Fig. 3.

Fig. 10 shows another form of my invention, positioned on the ground.

Fig. 11 shows the similar form of the invention, as in Fig. 10 however, in flying position.

Fig. 12 shows the guiding and adjusting apparatus, taken in the direction of the arrows 12—12, of the Fig. 10.

Fig. 13 is the adjusting apparatus, in disengaged position.

Describing my invention more in detail, said invention comprises front fuselage 2, and the rear fuselage 4, having the wings as at 6, the ailerons 8, the rudder 10 and the elevators 12; said front fuselage 2, is supported upon the landing gear 14 and the rear fuselage 4, upon the tail wheel 16, the said plane is propelled by a motor 18 having the propeller 19 as shown, which may be of any conventional design.

The front fuselage 2 and the rear fuselage 4, are hingedly associated as at 20, which may be, if preferred, through the wing section 6, (see Figs. 1, 3, 5 and 6), which comprises a shaft 22, having a plurality of eyelet rods 24 associated therewith, and which extend downwardly as at 26 (see Figs. 5 and 6), and which are securely attached to the fuselage covering 28, which may be of any pliable material, such as cloth, canvas, leather or the like, and which may be easily folded as at 30, thus relieving the obstruction from the bottom of the fuselage 2 and 4.

The interior of the front fuselage 2, is equipped with the brace 32, to which a hinged screw 34 is attached, which is associated with a screw bushing 36 and the screw head 38, having a hand wheel 40 substantially associated therewith; the screw head 38 is adapted to receive a stopper 42, which is hingedly associated as at 44, with the brace 46, which is the frame part of the fuselage 4.

It is obvious to note, that by turning the hand wheel 40, the head screw 38, also the screw bushing 36 and the hinged screw 34, will be drawn together, thus allowing the front fuselage 2 to become in line with the rear fuselage 4, pivoting about the pivot point 20.

The ailerons 8, being of wider structure surface as conventionally used, are hinged as at 48, and are adapted to be adjusted (as shown in dotted lines) by the pilot in any position which may be most adaptable to the air currents, created by the propeller 19.

The rudder 10, hingedly connected as at 50, with the rear fuselage 4, comprises of a double side walls structure 52, adapted to be received by the top structure 54, which has the elevators 12, horizontally associated as at 56, thus providing a greater surface for the rudder 10, as well as the elevators 12.

The side walls 58, the top 60 and the bottom 62 of said fuselage 2 and 4 respectively, are equipped with the enclosures 64 which may be if desired filled with the air, or gas, thus rendering said fuselage buoyant, also said enclosures 64 may be if desired equipped with the shock resisting structures 66, such as flat springs or the like, which may be constructed of any preferred configurations which in practice may be most efficient, flexible and entirely immune to shocks or fractures.

In the Figs. 10 and 11, I have shown the plane fuselage structure in modified form, with the pivot point as at 68, having the supporting wheel 70, and having the wing 6' securely attached to the front fuselage 2'.

The locking means 72, comprises a guide 74, which is slidably associated with the rear fuselage 4', upon which the latch 76 is hingedly positioned as at 78 and adapted to be associated with the locating holes 80, and which may be if preferred, operated by means of a handle 82, as shown.

While I have thus described my invention with great particularity it will be clear that the same may be modified throughout a wide range. I accordingly do not propose to be limited to the exact details of construction shown and described, but reserve the right in practice to make any and all modifications that may come within the scope of the appended claim.

I claim as my invention.

In an airplane structure, a fuselage comprising of the front section and the rear section, a front section adapted to receive the motor and the landing gear, the rear section adapted to receive the wings, steering gear and the supporting wheel, hingeable means associated with said front section and said rear section of said fuselage, and adjustable means associated with said hingeable means so that said sections may be adjusted to any desired angular position, and means for controlling said adjustable means.

In testimony whereof I have signed my name to this specification.

FRANK V. BARYCZ.